United States Patent
Barghi et al.

(10) Patent No.: US 10,405,335 B2
(45) Date of Patent: Sep. 3, 2019

(54) SOFT CHANNEL RESERVATION

(71) Applicant: QUALCOMM Incorporated, San Diego, CA (US)

(72) Inventors: Sanaz Barghi, Carlsbad, CA (US); Jing Sun, San Diego, CA (US); Mohammad Naghshvar, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 15/906,040

(22) Filed: Feb. 27, 2018

(65) Prior Publication Data

US 2018/0255561 A1    Sep. 6, 2018

Related U.S. Application Data

(60) Provisional application No. 62/465,274, filed on Mar. 1, 2017.

(51) Int. Cl.
*H04W 72/12* (2009.01)
*H04W 16/14* (2009.01)
(Continued)

(52) U.S. Cl.
CPC ...... *H04W 72/1231* (2013.01); *H04B 7/0408* (2013.01); *H04J 11/0026* (2013.01);
(Continued)

(58) Field of Classification Search
CPC ...... H04B 7/0408; H04J 11/0026; H04L 1/00; H04L 27/0006; H04L 27/26;
(Continued)

(56) References Cited

U.S. PATENT DOCUMENTS 9,831,992 B2 * 11/2017 Haghighat ............ H04W 24/02
9,980,296 B2 *  5/2018 Wang ................... H04W 74/004
(Continued)

OTHER PUBLICATIONS

Alawieh B. et al., "Improving Spatial Reuse in Multihop Wireless Networks—A Survey," IEEE Communications Surveys and Tutorials, Institute of Electrical and Electronics Engineers, US, vol. 11 (3), Oct. 1, 2009 XP011272508 pp. 71-91.
(Continued)

*Primary Examiner* — Liton Miah
(74) *Attorney, Agent, or Firm* — Norton Rose Fulbright LLP

(57) ABSTRACT

Soft channel reservation in shared spectrum networks is discussed. In network areas where multiple wireless nodes, whether from the same or different network operators, share spectrum using a channel reservation signaling form of contention resolution, an aggressor transmitter listens for a neighbor receiver's receiver channel reservation signal to the neighbor transmitter the neighbor receiver is in communication with. The receiver channel reservation signal includes channel condition information that the aggressor transmitter can use to estimate an interference impact at the neighbor receiver should the aggressor transmitter performs its transmissions to its own receivers. Based on whether this estimated interference impact exceeds or remains within a particular threshold, the aggressor transmitter may decide whether or not to back off of its transmissions until a later time.

24 Claims, 8 Drawing Sheets

(51) Int. Cl.
*H04B 7/0408* (2017.01)
*H04J 11/00* (2006.01)
*H04L 27/00* (2006.01)
*H04W 74/08* (2009.01)
*H04L 1/00* (2006.01)
*H04L 1/20* (2006.01)
*H04W 16/28* (2009.01)
*H04L 27/26* (2006.01)
*H04L 5/00* (2006.01)

(52) U.S. Cl.
CPC .............. *H04L 1/0026* (2013.01); *H04L 1/20* (2013.01); *H04L 27/0006* (2013.01); *H04W 16/14* (2013.01); *H04W 72/1273* (2013.01); *H04W 74/0816* (2013.01); *H04L 5/0073* (2013.01); *H04L 27/26* (2013.01); *H04W 16/28* (2013.01)

(58) Field of Classification Search
CPC .... H04L 5/0073; H04W 16/14; H04W 16/28; H04W 72/1231; H04W 72/1273; H04W 74/0816
See application file for complete search history.

(56) References Cited

U.S. PATENT DOCUMENTS

| | | |
|---|---|---|
| 2012/0099449 A1 | 4/2012 | Madan et al. |
| 2015/0078259 A1 | 3/2015 | Junior et al. |
| 2017/0013470 A1 | 1/2017 | Sun et al. |
| 2017/0013479 A1 | 1/2017 | Sun et al. |
| 2017/0171781 A1* | 6/2017 | Seo ................. H04W 24/10 |

OTHER PUBLICATIONS

International Search Report and Written Opinion—PCT/US2018/020123—ISA/EPO—dated Jun. 6, 2018.

ZTE: "PHY Layer Solutions for LAA Design," 3GPP Draft; R1-150152 PHY Layer Solutions for LAA Design, 3rd Generation Partnership Project (3GPP), Mobile Competence Centre; 650, Route Des Lucioles; F-06921, Sophia-Antipolis Cedex; France, vol. RAN WG1, no. Athens, Greece; Feb. 9, 2015-Feb. 13, 2015. Feb. 8, 2015, XP050933366, Retrieved from the Internet: URL: http://www.3gpp.org/ftp/Meetings_3GPP_SYNC/RAN1/Docs/ [retrieved on Feb. 18, 2018].

* cited by examiner

SOFT CHANNEL RESERVATION

CROSS-REFERENCE TO RELATED APPLICATIONS

This application claims the benefit of U.S. Provisional Patent Application No. 62/465,274, entitled, "SOFT CHANNEL RESERVATION," filed on Mar. 1, 2017, which is expressly incorporated by reference herein in its entirety.

BACKGROUND

Field

Aspects of the present disclosure relate generally to wireless communication systems, and more particularly, to soft channel reservation in millimeter wave (mmWave) shared spectrum networks.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes monitoring, by a transmitter, a transmission beam direction associated with one or more receivers identified for communication with the transmitter, detecting a receiver channel reservation signal from one or more neighbor receivers communicating with one or more different transmitters, wherein the receiver channel reservation signal detected from a neighbor receiver of the one or more neighbor receivers includes channel condition information identifying channel conditions observed at the neighbor receiver, estimating, by the transmitter, an interference impact metric using the channel condition information, wherein the interference impact metric estimates an impact on the channel conditions observed at the one or more neighbor receivers caused by transmission by the transmitter, and determining, by the transmitter, to back off transmission with the one or more receivers in the transmission beam direction in response to the interference impact metric remaining within a threshold interference.

In an additional aspect of the disclosure, a method of wireless communications includes receiving, at a receiver, a transmitter channel reservation signal from a transmitter in communication with the receiver, estimating, at the receiver, a total signal-to-interference metric experienced at the receiver based on one or more of: expected transmissions from one or more neighbor transmitters transmitting one or more neighbor transmitter channel reservation signals received at the receiver, and actual transmissions detected from one or more additional neighbor transmitters at the receiver, and determining, by the receiver, to refrain from transmitting a receiver channel reservation signal to the transmitter in response to the total signal-to-interference metric remaining within a threshold signal-to-interference level.

In an additional aspect of the disclosure, an apparatus configured for wireless communication includes means for monitoring, by a transmitter, a transmission beam direction associated with one or more receivers identified for communication with the transmitter, means for detecting a receiver channel reservation signal from one or more neighbor receivers communicating with one or more different transmitters, wherein the receiver channel reservation signal detected from a neighbor receiver of the one or more neighbor receivers includes channel condition information identifying channel conditions observed at the neighbor receiver, means for estimating, by the transmitter, an interference impact metric using the channel condition information, wherein the interference impact metric estimates an impact on the channel conditions observed at the one or more neighbor receivers caused by transmission by the transmitter, and means for determining, by the transmitter, to back off transmission with the one or more receivers in the transmission beam direction in response to the interference impact metric remaining within a threshold interference.

In an additional aspect of the disclosure, an apparatus configured for wireless communication includes means for receiving, at a receiver, a transmitter channel reservation signal from a transmitter in communication with the receiver, means for estimating, at the receiver, a total signal-to-interference metric experienced at the receiver based on one or more of: expected transmissions from one or more neighbor transmitters transmitting one or more neighbor transmitter channel reservation signals received at the receiver, and actual transmissions detected from one or more additional neighbor transmitters at the receiver, and means for determining, by the receiver, to refrain from transmitting a receiver channel reservation signal to the transmitter in response to the total signal-to-interference metric remaining within a threshold signal-to-interference level.

In an additional aspect of the disclosure, a non-transitory computer-readable medium having program code recorded thereon. The program code further includes code to monitor, by a transmitter, a transmission beam direction associated with one or more receivers identified for communication with the transmitter, code to detect a receiver channel reservation signal from one or more neighbor receivers communicating with one or more different transmitters, wherein the receiver channel reservation signal detected from a neighbor receiver of the one or more neighbor receivers includes channel condition information identifying channel conditions observed at the neighbor receiver, code to estimate, by the transmitter, an interference impact metric using the channel condition information, wherein the interference impact metric estimates an impact on the channel conditions observed at the one or more neighbor receivers caused by transmission by the transmitter, and code to determine, by the transmitter, to back off transmission with the one or more receivers in the transmission beam direction in response to the interference impact metric remaining within a threshold interference.

In an additional aspect of the disclosure, a non-transitory computer-readable medium having program code recorded thereon. The program code further includes code to receive, at a receiver, a transmitter channel reservation signal from a transmitter in communication with the receiver, code to estimate, at the receiver, a total signal-to-interference metric experienced at the receiver based on one or more of: expected transmissions from one or more neighbor transmitters transmitting one or more neighbor transmitter channel reservation signals received at the receiver, and actual transmissions detected from one or more additional neighbor transmitters at the receiver, and code to determine, by the receiver, to refrain from transmitting a receiver channel reservation signal to the transmitter in response to the total signal-to-interference metric remaining within a threshold signal-to-interference level.

In an additional aspect of the disclosure, an apparatus configured for wireless communication is disclosed. The apparatus includes at least one processor, and a memory coupled to the processor. The processor is configured to monitor, by a transmitter, a transmission beam direction associated with one or more receivers identified for communication with the transmitter, to detect a receiver channel reservation signal from one or more neighbor receivers communicating with one or more different transmitters, wherein the receiver channel reservation signal detected from a neighbor receiver of the one or more neighbor receivers includes channel condition information identifying channel conditions observed at the neighbor receiver, to estimate, by the transmitter, an interference impact metric using the channel condition information, wherein the interference impact metric estimates an impact on the channel conditions observed at the one or more neighbor receivers caused by transmission by the transmitter, and to determine, by the transmitter, to back off transmission with the one or more receivers in the transmission beam direction in response to the interference impact metric remaining within a threshold interference.

In an additional aspect of the disclosure, an apparatus configured for wireless communication is disclosed. The apparatus includes at least one processor, and a memory coupled to the processor. The processor is configured to receive, at a receiver, a transmitter channel reservation signal from a transmitter in communication with the receiver, to estimate, at the receiver, a total signal-to-interference metric experienced at the receiver based on one or more of: expected transmissions from one or more neighbor transmitters transmitting one or more neighbor transmitter channel reservation signals received at the receiver, and actual transmissions detected from one or more additional neighbor transmitters at the receiver, and to determine, by the receiver, to refrain from transmitting a receiver channel reservation signal to the transmitter in response to the total signal-to-interference metric remaining within a threshold signal-to-interference level.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
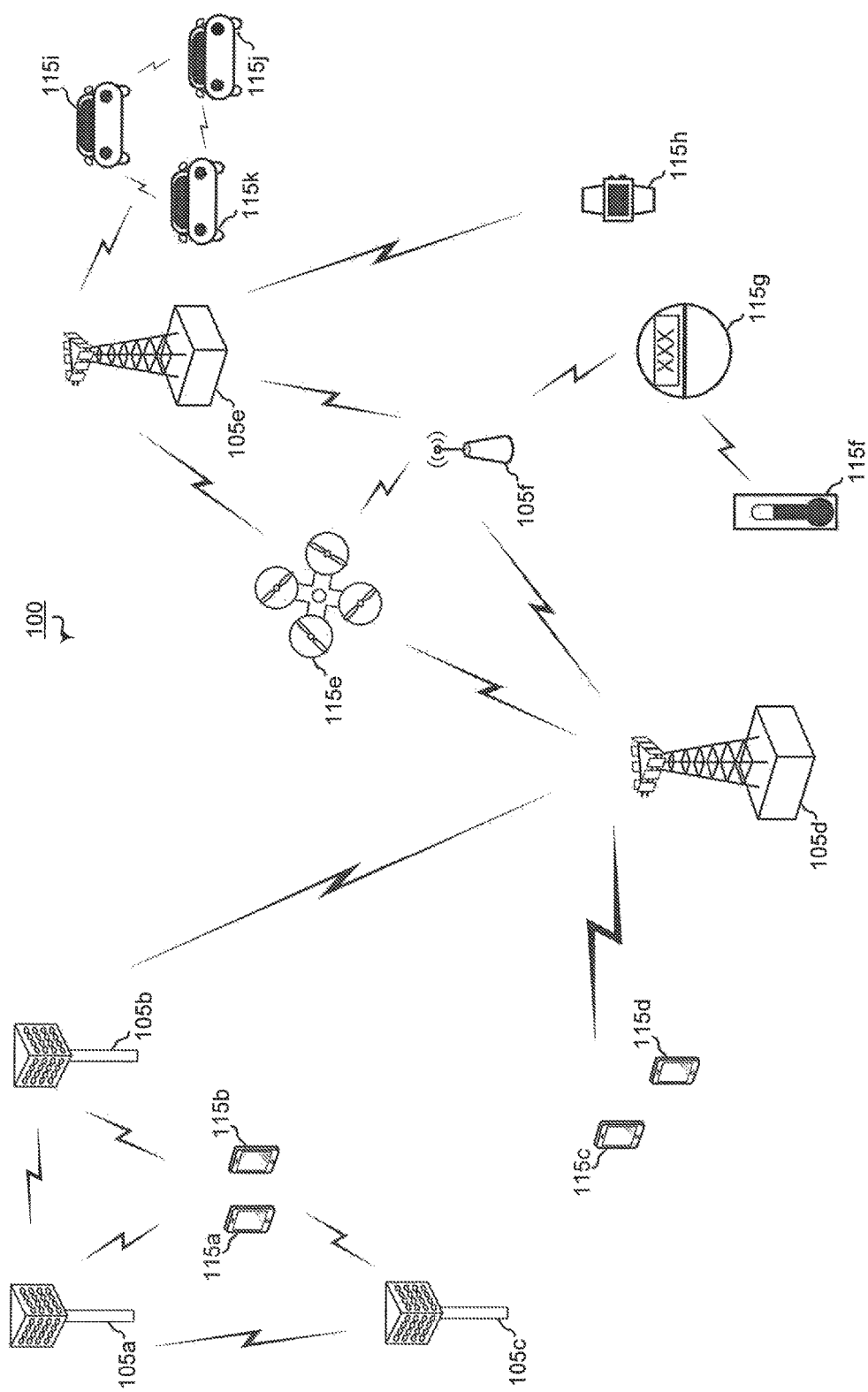
FIG. 1 is a block diagram illustrating details of a wireless communication system.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
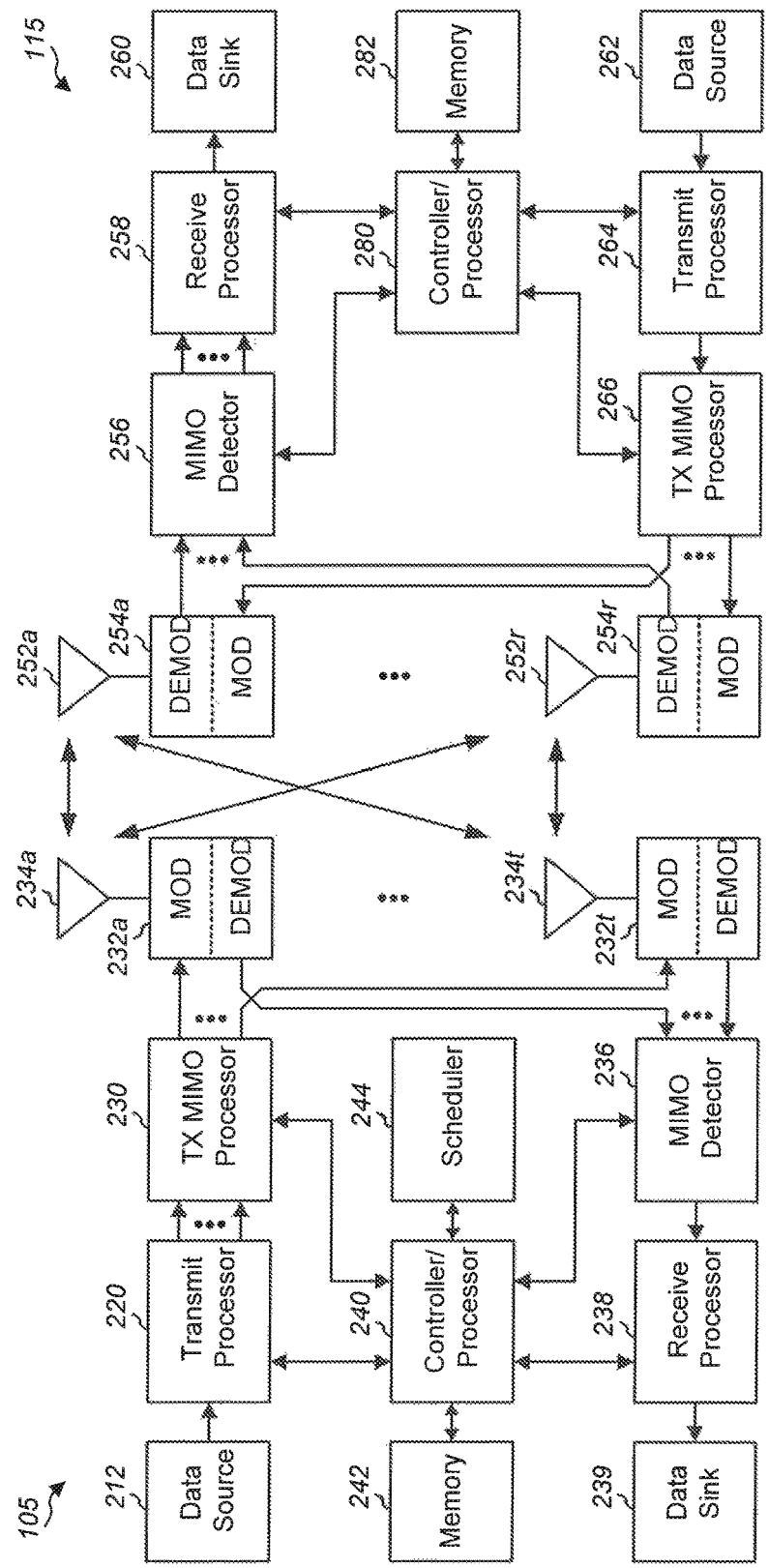
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 6 and 7, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
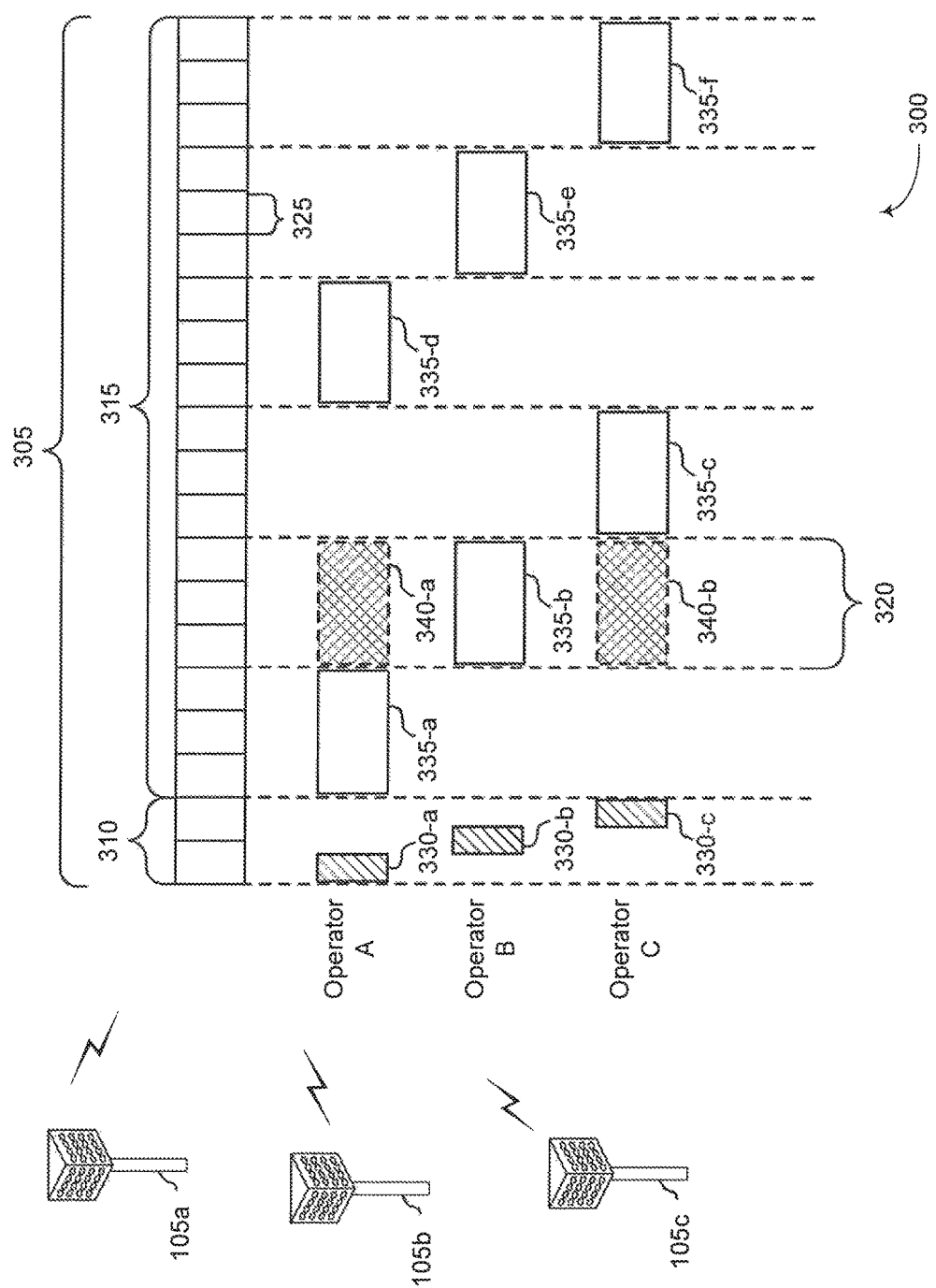
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4:
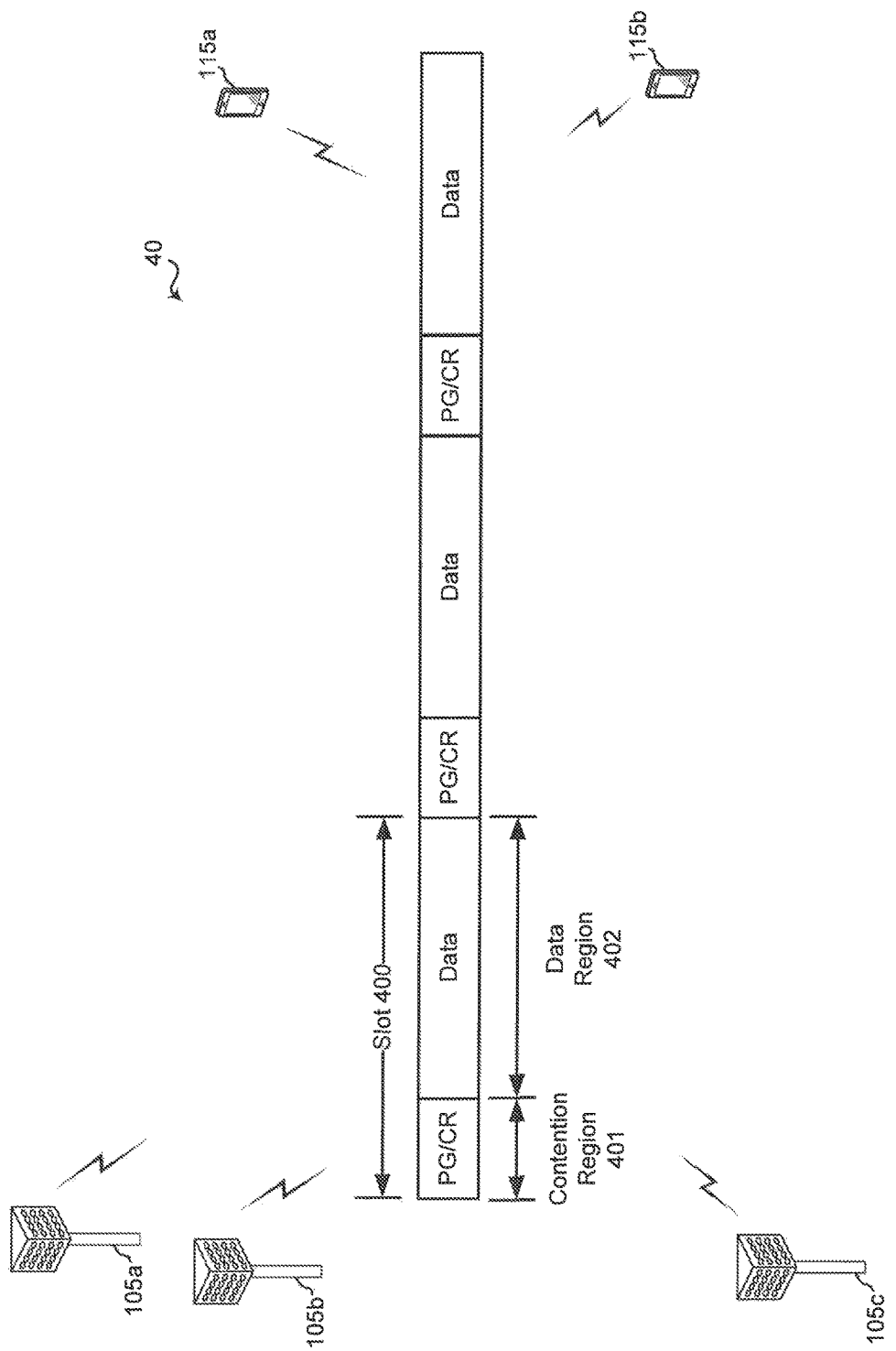
FIG. 4 is a block diagram illustrating shared spectrum network.

FIG. 4 is a block diagram illustrating shared spectrum network 40. In a shared spectrum (unlicensed spectrum) use case, such as shared spectrum network 40, it may be beneficial to have a contention mechanism to allow different links to share the spectrum. Sharing may occur between different operators and within the same operator but sharing between different links (including downlink/uplink). Shared spectrum network 40 includes base stations 105a-105c and UEs 115a and 115b. The various aspects described herein involve frame-based equipment (FBE), in which there is known timing across all nodes (e.g., base stations 105a-105c and UEs 115a and 115b) and the channel is divided in units of slots in the time domain, such as slot 400. The active nodes may contend for the channel on a slot-by-slot manner. In each slot, such as slot 400, there may be a contention region 401 at the beginning, to decide on which links will be active, followed by a data transmission portion 402. For effective coexistence, it may be understood that two transmitters or two receivers will not interfere with each other, but a transmitter of one link may interfere with the receiver of another link.

In systems having operating frequencies under 6 GHz, an approach has been suggested for channel contention using contention messages sent during a contention slot. Such sub-6 GHz operations assume a single operator that supports dynamic time division duplex (TDD). The contention region may also be assumed to be at the beginning of a transmission slot. Within the contention region, a resource request (RRQ), which would be transmitted from an eNB or base station. The responding signal is the resource receiver signal (RRS), which is transmitted from the receiver (e.g., eNBs in uplink communications or UEs in downlink communications). Other potential transmitters may see this RSS and may back-off, assuming that the other potential transmitters will interfere with this RRS. The sub-6 GHz proposal may also further assume there is a known priority direction (downlink or uplink) in a given slot. The RRQ may be transmitted from the eNB, and the RRS from the receiver of the default direction. A clear-to-send RRS (CRS) may be transmitted from the transmitter of the alternative direction (the non-priority direction). One interesting issue involves the RRS from the receiver, in which either the UE or eNB may be transmitting at the same time. One potential problem with this operation is that there may be no announcement from potential transmitters. Therefore, when the receiver announces an RRS, it may not explicitly knowing if there is an actual interferer.

For the various aspects of the present disclosure, there are three signaling components: (1) Pre-grant (PG) signaling, which may carry identification of the entity to be scheduled along with an uplink or downlink grant, as dictated by the scheduled entity (PG signaling may include both data PG and contention PG signals); (2) channel reservation-transmitter (CR-T) signaling, which announces the intent of the transmitter to transmit the data to a target UE, includes communication of the transmit power information; and (3) channel reservation-receiver (CR-R) signaling, which announces the intent to receive data from a target transmitter, and includes the acceptable interference level and the current CR-R transmit power information. The receiver nodes receiving such CR-T may determine how much interference will be experienced based on the transmitting nodes' transmissions. The transmitter nodes receiving the CR-R may determine how much interference will be generated when transmitting data and if this level of interference is acceptable to the receiver node.

For the shared spectrum (unlicensed spectrum) use case, a contention mechanism may be useful to allow different links to share the same spectrum. Sharing of the spectrum may occur between links of different operators and between different links within the same operator (including downlink/uplink). For effective coexistence, two transmitters or two receivers will not interfere with each other. However, a transmitter of one link may interfere with the receiver of another link. The various aspects of the present disclosure described herein may take advantage of this relationship to reduce link-to-link interference.

In general, within a region of low signal-to-interference plus noise ratio (SINR), a relatively small gain in SINR (e.g., 3 dB, 6 dB, etc.) may recover from 50% loss in reuse. However, when the region experiences higher SINRs (e.g., 15 dB, 20 dB, etc.), a recovery from 50% reuse loss would correspond to more of a doubling of SINR gains (e.g., 15 dB 20 dB, etc. gain). Networks with nodes configured for communication using the mmWave spectrum may experience very high average signal-to-noise ratios (SNRs) and SINRs operating points. Blindly silencing all interferers independent of their interference level (as performed in many WiFi type operations) generally reduces the reuse of the spectrum without a SINR gain substantial enough to cover the loss in reuse over-silencing of interferers. The various aspects of the present soft channel reservation (SCR) designs may silence interferers that matter while protecting transmissions that need protection against interference.

Figure 5:
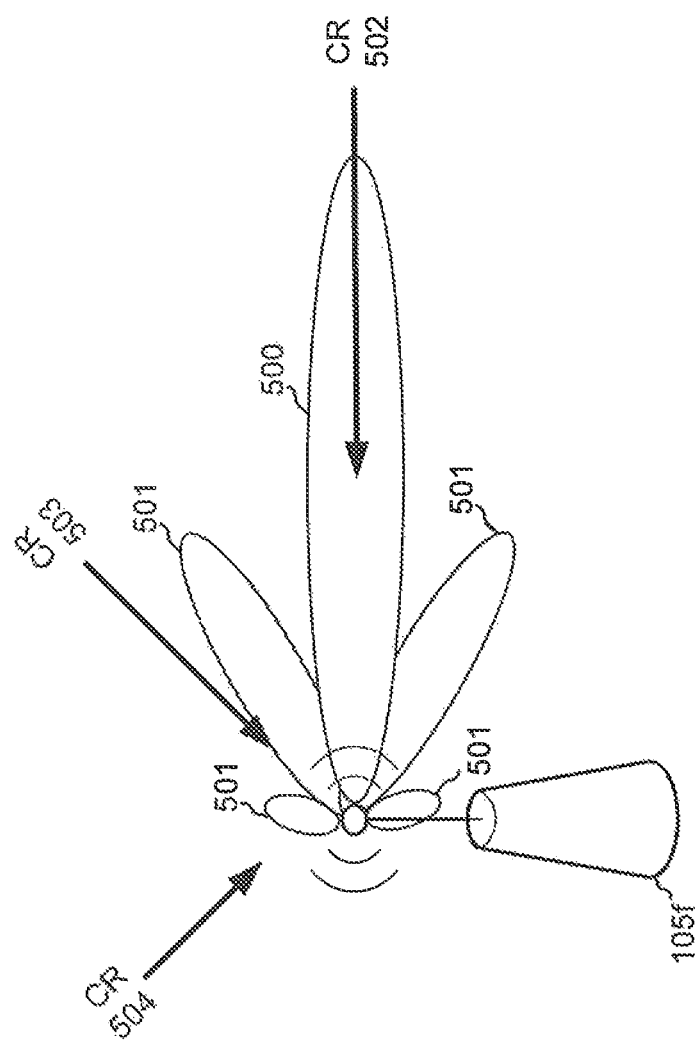
FIG. 5 is a block diagram illustrating a base station configured for mmWave transmissions.

FIG. 5 is a block diagram illustrating base station 105*f* configured for mmWave transmissions. mmWave transmissions are highly directional and include a radiation pattern having a main lobe 500, that includes the highest field strength of the transmission in the main direction of the transmission, and side lobes 501, that include the local maxima of the far field radiation pattern other than the main lobe. The interference region for mmWave transmissions is typically defined per link (base station-UE pair) rather than per transmitter. With the more narrowband transmission beams of mmWave communications, it may be important to protect directional channel reservation (CR)/LBT against over silencing. Interference observed from side lobes 501 is relatively insignificant compared to interference observed from main lobe 500. Each link can observe interference from side lobes of multiple interferers (e.g., CR 503, CR 504) as observed from side lobes 501. Silencing all side lobe interferers, CR 503-504, reduces the reuse significantly while only contributing to a small SINR gain. Thus, the various aspects of the present disclosure provides for silencing an aggressor transmitter based on interference level at the victim receiver.

As referenced above with respect to FIG. 4, each transmission in data transmission portion 402 follows channel reservation (CR) signals (e.g., CR-T, CR-R) in contention region 401. CR-T from the transmitter of the link followed by CR-R from the receiver of the link. In mmWave operations, CR-T may be transmitted on the transmit beam. In a case where a base station is serving multiple UEs, it may be possible to send CR-T on a combined beam that covers all transmission directions. The transmit power for CR-T may be the same as that for the data transmission. In operations where the transmit power for CR-T is not the same, the base station may advertise the back-off in system information messages.

On the receiver side of mmWave operations, CR-R may be transmitted by the receiver on the receive beam. According to the aspects of the present disclosure, each CR-R carries channel condition information, such as SINR at the receiver transmitting the CR-R, carrier-to-noise (C/N) ratio at the receiver, interference-to-noise (I/N) ratio at the receiver, transmit power that the receiver uses to transmit the CR-R, interference headroom at the receiver, an ID of aggressor links, which may include the receiver ID (e.g., base station ID or UE ID) and/or a beam index of the base station, transmission duration, ID of the aggressor transmitter for which the victim receiver would benefit if the aggressor transmitter backed off transmissions, a transmission length allocated or granted to the receiver; a SINR threshold for the neighbor receiver, a public land mobile network (PLMN) identifier at the receiver that may identify which network operator is associated with the receiver, and the like.

Figure 6:
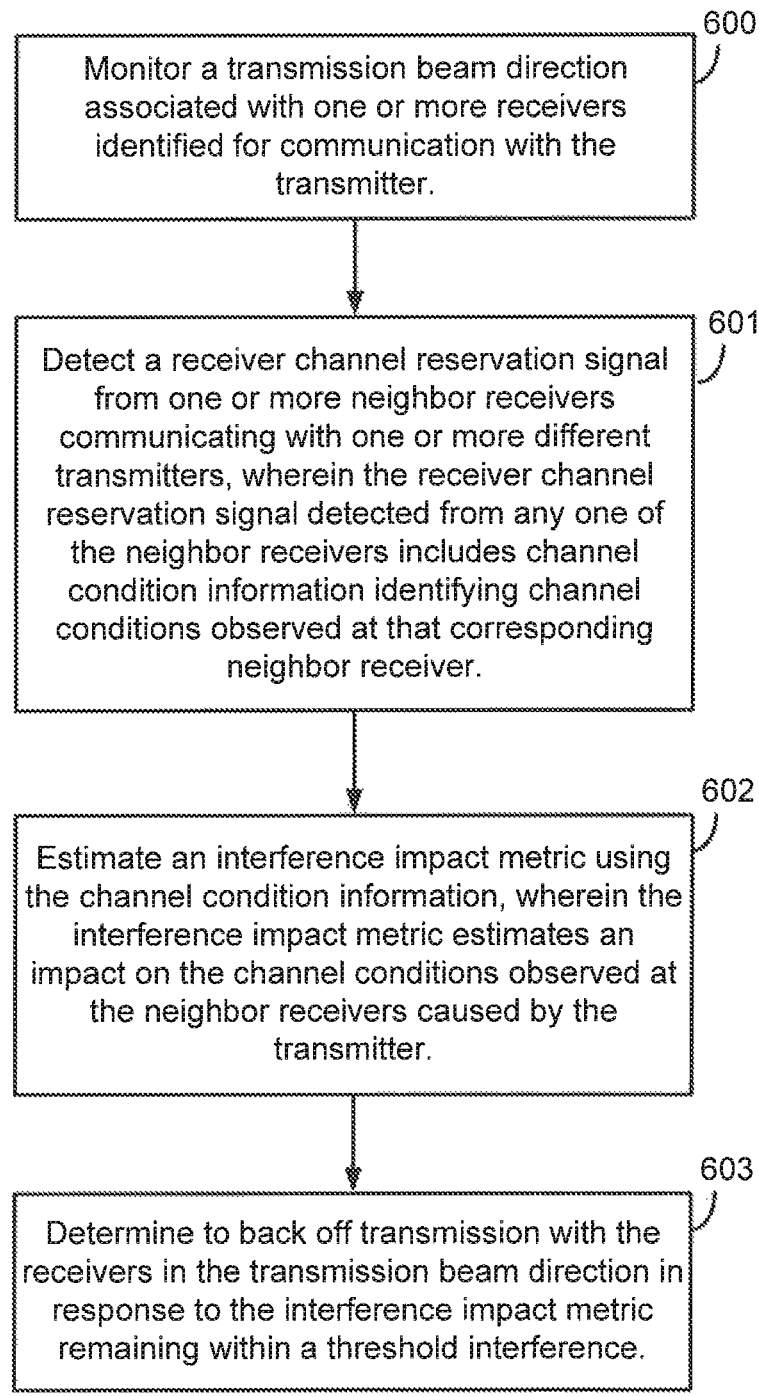
FIG. 6 is a block diagram illustrating example blocks executed to implement one aspect of the present disclosure.

FIG. 6 is a block diagram illustrating example blocks executed to implement one aspect of the present disclosure. At block 600, an aggressor transmitter monitors a transmission beam direction associated with one or more receivers identified for communication with the transmitter. When preparing for transmission, an aggressor transmitter knows, in advance, the transmission beam that it will use for the direction of the associated receiver. As such, the aggressor transmitters may listen or monitor for CR-R messages from victim receivers on the aggressor transmitters' transmission beam. The beam used by the aggressor transmitter to listen or monitor for such victim CR-R may be configured wider than the actual transmission beam in order to cover more direction. Moreover, depending on the capability of the aggressor transmitter, it might be capable of listening on multiple narrow beams in different directions simultaneously and then transmitting on a subset of those directions.

At block 601, the aggressor transmitter detects a receiver channel reservation signal from one or more neighbor receivers communicating with one or more different transmitters, wherein the receiver channel reservation signal includes channel condition information identifying channel conditions observed at the one or more neighbor receivers.

At block 602, the aggressor transmitter estimates an interference impact metric using the channel condition information, wherein the interference impact metric estimates an impact on the channel conditions observed at the one or more neighbor receivers caused by transmission by the transmitter. Because the interference of interest from the aggressor transmitter over the transmit beam will be in a similar direction that the victim receiver will be receiving transmissions over the receive beam, the aggressor base station may use link reciprocity along with the channel condition information reported within the CR-R, to calculate an estimate of the interference level at victims receiver.

At block 603, the aggressor transmitter determines to back off transmission with the one or more receivers in the transmission beam direction in response to the interference impact metric remaining within a threshold interference. When the interference impact metric remaining within the threshold, the aggressor transmitter determines to continue with transmissions. For example, based on the initial SINR (C/(I+N), where C represents the carrier signals, I represents interference, and N represents the noise) reported by CR-R and the amount of additional interference caused at the victim receivers, the aggressor transmitter may make a determination of whether or not to transmit in victim receiver's direction.

Figure 7:
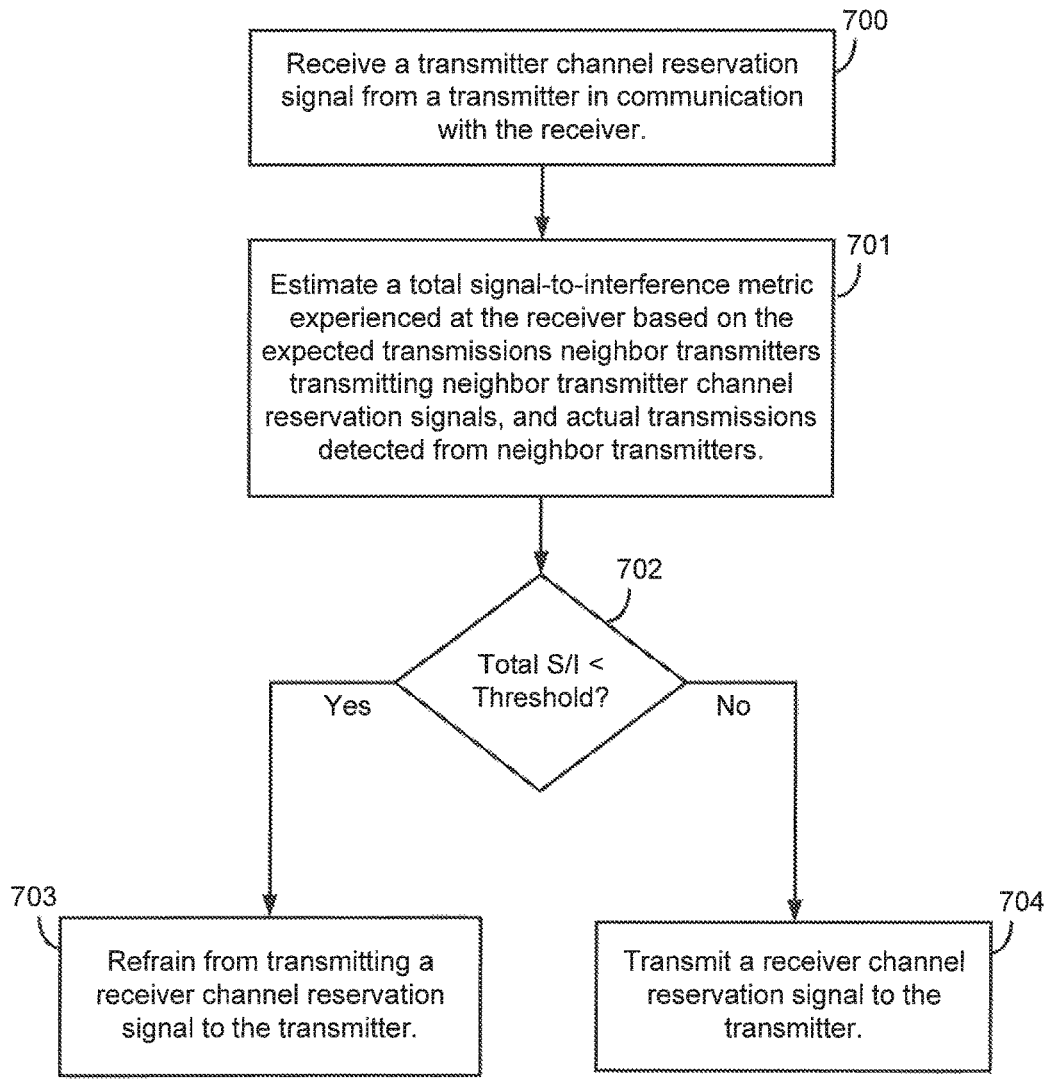
FIG. 7 is a block diagram illustrating example blocks executed to implement one aspect of the present disclosure.

FIG. 7 is a block diagram illustrating example blocks executed to implement one aspect of the present disclosure. At block 700, an aggressor's receiver receives a transmitter channel reservation signal from a transmitter in communication with the receiver.

At block 701, the aggressor's receiver estimates a total signal-to-interference metric experienced at the receiver based on either or both of the expected transmissions from one or more neighbor transmitters transmitting transmitter channel reservation signals, and the actual transmissions detected from neighbor transmitters.

At block 702, a determination is made whether the estimated total signal-to-interference metric remaining within a threshold value. If the threshold is not exceeded, then, at block 703, the aggressor's receiver determines to refrain from transmitting a receiver channel reservation signal to the transmitter in response to the total signal-to-interference metric remaining within a threshold signal-to-interference level. Otherwise, at block 704, when the total signal-to-interference metric exceeds the threshold, the receiver may elect to transmit the receiver channel reservation signal.

For the aggressor's receiver, upon reception of CR-T from its transmitter, the receiver can decide to honor the channel reservation and respond with CR-R or ignore the CR-T (or/and possibly the grant). If the receiver observes high level of interference (from overhearing CR-T of other nodes, or getting interfered by data transmission from other links) it can ignore CR-T and do not send back CR-R.

Figure 8:
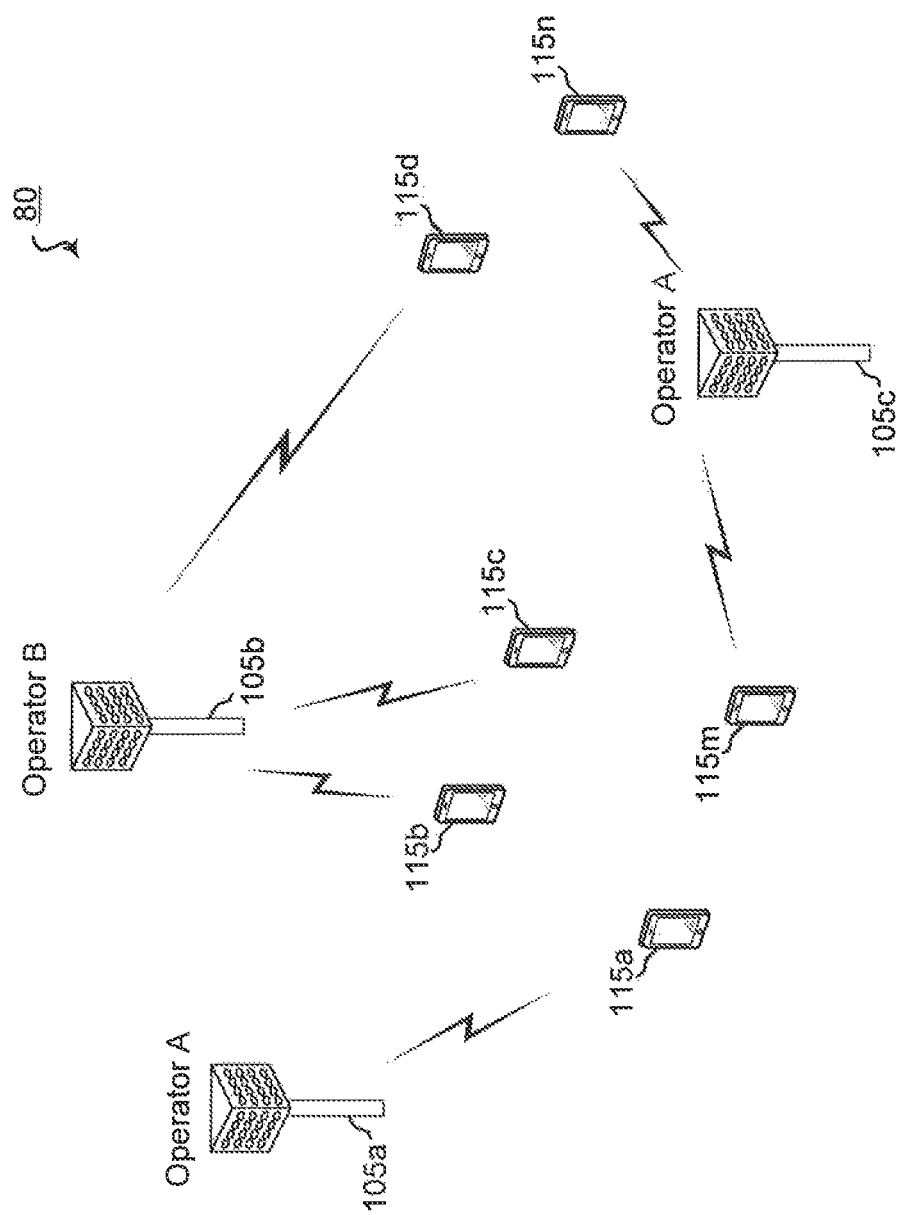
FIG. 8 is a block diagram illustrating a shared spectrum wireless network having base stations and UEs each configured according to aspects of the present disclosure.

FIG. 8 is a block diagram illustrating shared spectrum wireless network 80 having base stations 105a-105c and UEs 105a-105d, 105m, 105n each configured according to aspects of the present disclosure. Base stations 105a and 105c, along with its links to UEs 115a, 115m, and 115n, are operated by Operator A, while base station 105b, along with its links to UEs 115b-115c, is operated by Operator B with each configured for mmWave communications.

For purposes of a first operational example of one aspect of the present disclosure, base station 105a may be considered the aggressor transmitter in its downlink communications with UE 115a. The victim receivers are UEs 115b, 115c, and 115m served by transmitters of base stations 105b and 105c, respectively. Prior to transmitting communications to UE 115a, base station 105a monitors for CR-R transmitted from UEs 115b, 115c, and 115m. In the first described example, base station 105a receives CR-R transmitted by UE 115c to base station 105b of Operator B. Within the CR-R, base station 105a extracts the channel condition information, including the initial SINR at UE 115c, the transmit power, and the like. Before base station 105a determines whether or not to go forward with communications to UE 115a, it estimates an interference that would be observed at UE 115c including the transmissions from base station 105a to UE 115a. In the first example, the resulting SINR estimate exceeds the SINR threshold. Because the SINR estimated by base station 105a exceeds the SINR threshold, the determination is made to continue with the downlink transmissions to UE 115a. With such a high estimated SINR, the loss of reuse by silencing the downlink transmissions would not result in enough of a substantial gain in SINR to make up for the reuse loss.

In a second example operations, the resulting SINR does not exceed the SINR threshold. If the SINR threshold is not exceeded, base station 105a would further determine an interference impact metric that quantifies the gain in SINR that would be achieved by base station 105a backing off of the downlink transmission to UE 115a. In this second described example, the interference impact metric identifies that the interference that would be caused by the downlink transmissions are a dominant interference to UE 115c. Accordingly, base station 105a determines to back off from transmitting its downlink communications to UE 115a at this time.

In a third example operation, the CR-R received is from UE 115m, served by base station 105c of Operator A. Having determined that the estimated SINR does not exceed the SINR threshold, base station 105a further determines that its downlink transmissions would not be a dominant interference to UE 115m. Because of the highly directional nature of the mmWave transmission beams, at most any interference observed at UE 115m would be observed in a side lobe of the receiver beam. As such, the gain in SINR achieved at UE 115m would be minimal compared to the reuse loss experienced in the network by silencing the transmissions of base station 105a.

Thus, the decision tree at an aggressor transmitter, such as base station 105a, based on estimate of interference at victim receivers (UEs 115b, 115c, or 115m) calculated using the channel condition information received in the victim receivers CR-R, would be: 1) do not back-off if the effective SINR at the victim receiver would be more than a SINR threshold (e.g., 15 dB, 20 dB, etc.), as the high SINR victims would not necessarily need protection, since the SINR gain from silencing aggressors would not cover the loss in reuse; and 2) do not back-off if the effective SINR at the victim receiver is less than predetermined impact threshold, p dB, compared to the original SINR of the victim (e.g., p=3 dB, 6 dB, etc.). If interference from the aggressor (base station 105a) is not a dominant interference for the victim link, silencing this interferer does not result in enough SINR gain to cover the reuse loss.

These conditions can be extended to the case of receiving multiple CR-Rs before initiating the transmission. For example, in a next example operation, base station 105a receives CR-Rs from each of UEs 115b, 115c, and 115m. In one example aspect for addressing multiple CR-R received at base station 105a, base station 105a calculates the estimate of SINR at each of UEs 115b, 115c, and 115m. Base station 105a determines an interference relationship between the estimated SINR of each of the UEs. The relationship may be an average, a medium, or a relationship between the SINR of each node using different weighting factors based on which network operator the node belongs. The interference relationship between the estimated SINR of each of the UEs may be determined by any various means. If the interference relationship of the estimated SINR exceeds a SINR threshold, which may be different than a SINR threshold for a single CR-R occasion or even different SINR thresholds associated with different operators, then base station 105a would not back off transmissions. Otherwise, if the SINR threshold is not exceeded, base station 105a would further determine whether the impact of its silencing its transmissions would be at least enough for the predetermined impact threshold, p, which, again, could be a different value for consideration of multiple victim receivers, such as by averaging, weighting the values differently based on the network operator the neighbor receiver belongs to. Moreover, the calculations for the expected SINR of the victims that are a part of its own operator, Operator A, may be different than the calculations for the expected SINR of the victims that are part of a different operator, e.g., Operator B.

In an additional example aspect illustrated in FIG. 8, the decision rule at the aggressor transmitter, base station 105*a*, may be based on the victim receiver (UEs 115*b*, 115*c*, 115*m*) flagging the interferer by including the ID of the aggressor link that is causing significant interference in the channel condition information of the CR-R. In such example aspect, base station 105*a*, receiving the CR-R from UE 115*b* that includes an ID of its own communication link would estimate the total SINR, compare it against the SINR threshold and, if within the threshold amount, would back off from transmissions based on the ID of its own link contained in the CR-R.

In operation, UE 115*b*, as the victim receiver may identify the aggressors link ID, if the aggressor transmitter is base station, as in the described example, by using the beam ID contained in the synchronization signal (e.g., PSS, SSS) of base station 105*a*. Because a transmission beam is a highly direction beam in the direction of the target UE, the aggressor link may also be identified using the UE ID of the aggressor link pair. UE 115*b* may be able to identify the UE ID by overhearing previous CR-Ts, grants for UE 115*a*. The CR-T would carry the ID of the receiver UE (here, UE 115*a*). Otherwise, if the aggressor transmitter is a UE, for example, if the aggressor transmitter is UE 115*c*, the UE ID of UE 115*c* may be identified by UE 115*b* by overhearing previous CR-Ts from UE 115*c*. The CR-T would carry the ID of the transmitter.

It should be noted that when a UE ID is used for identifying the aggressor interferer, both CR-T and CR-R messages should carry a bit to clarify whether the UE ID is for the aggressor transmitter or aggressor receiver of the link.

Additional example aspects of the present disclosure may also be illustrated in FIG. 8, in which the decision rule at the aggressor transmitter, base station 105*a*, may be based on feedback from the victim receiver (e.g., UE 115*c*). One parameter that may also be included in the channel condition information contained in CR-R is the interference headroom. For example, the victim receiver, UE 115*c*, calculates the interference level that can be tolerated by its own transmission. This value may depend on modulation coding scheme (MCS), hybrid automatic repeat request (HARQ) process, and the like of UE 115*c*. The aggressor transmitter, base station 105*a*, calculates the estimated interference caused at UE 115*c* using the other channel condition information in the CR-R message (e.g., SINR, C/N, I/N, transmit power, etc.) and based on the reciprocity of the link. Base station 105 would then compare the estimated interference level with the interference headroom, also identified in the channel condition information of the CR-R. Depending on whether the estimated interference remains within the interference headroom or exceeds the headroom, base station 105*a* would be able to make the decision to transmit or back off transmission, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6 and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   monitoring, by a transmitter, a transmission beam direction associated with one or more receivers identified for communication with the transmitter;
   detecting, by the transmitter, a receiver channel reservation signal from one or more neighbor receivers communicating with one or more different transmitters, wherein the receiver channel reservation signal detected from a neighbor receiver of the one or more neighbor receivers includes channel condition information identifying channel conditions observed at the neighbor receiver;
   estimating, by the transmitter, an interference impact metric using the channel condition information, wherein the interference impact metric estimates an impact on the channel conditions observed at the one or more neighbor receivers caused by transmission by the transmitter; and
   determining, by the transmitter, to back off transmission with the one or more receivers in the transmission beam direction in response to the interference impact metric remaining within a threshold interference.

2. The method of claim 1, wherein the transmission beam direction includes one of:
   a beam configured to be wider than a transmission beam such that a beam width of the transmission beam direction includes a potential plurality of narrow transmission beams over a maximum of 360 degrees; or
   a plurality of narrow beams in different directions along a same general direction as the transmission beam for the one or more receivers.

3. The method of claim 1, wherein the estimating includes:
   estimating the interference impact metric:
      using a first calculation for any one or more first receivers of the one or more neighbor receivers operated by a same network operator associated with the transmitter; and
      using another calculation for any one or more other receivers of the one or more neighbor receivers operated by a different network operator.

4. The method of claim 1, further including:
   determining a measure of signal-to-interference at the one or more neighbor receivers;
   determining the interference impact metric exceeds the threshold interference when the measure of signal-to-interference is greater than a maximum level.

5. The method of claim 4, further including:
   determining an effective improvement to the measure of signal-to-interference based on the transmitter backing off transmission to the one or more receivers,
   wherein the interference impact metric remains within the threshold interference when the effective improvement exceeds a predetermined amount; and
   the interference impact metric exceeds the threshold interference when the effective improvement fails to exceed the predetermined amount.

6. The method of claim 5, wherein at least two receiver channel reservation signals are received from at least two of the one or more neighbor receivers,
   wherein the determining the measure includes determining the measure of signal-to-interference at the at least two of the one or more neighbor receivers,
   wherein the determining the effective improvement includes:
      determining a signal-to-interference gain at each of the at least two of the one or more neighbor receivers; and
      determining an interference relationship of the signal-to-interference gain of the at least two of the one or more neighbor receivers,
      wherein the interference impact metric corresponds to the interference relationship, and
      wherein the predetermined amount is predetermined according to a number of the at least two or the one or more neighbor receivers from which the at least two receiver channel reservation signals is received.

7. The method of claim 1, further including:
   identifying, by the transmitter, a node identifier (ID) within the channel condition information, wherein the node ID includes one or more of: an ID of one or more interfering transmitters causing substantial interference at the neighbor receiver from which the receiver channel reservation signal is detected, or an ID of one or more user equipments (UEs) associated with a direction of transmission causing the substantial interference from the one or more interfering transmitters;

performing the estimating and the determining when the node ID is associated with the transmitter.

8. The method of claim 1, wherein the threshold interference corresponds to an interference headroom included within the channel condition information.

9. The method of claim 1, wherein the channel condition information includes one or more of:
signal-to-interference plus noise ratio (SINR) at the neighbor receiver;
carrier-to-noise ratio at the neighbor receiver;
interference-to-noise ratio at the neighbor receiver;
transmit power of the neighbor receiver for transmission of the receiver channel reservation signal;
an interference headroom at the neighbor receiver;
identifier (ID) of one or more interfering transmitters causing substantial interference at the neighbor receiver;
an ID of one or more user equipments (UEs) associated with a direction of transmission causing the substantial interference from the one or more interfering transmitters;
a transmission length of the neighbor receiver;
SINR threshold for the neighbor receiver; and
a public land mobile network (PLMN) of the neighbor receiver.

10. A method of wireless communications, comprising:
receiving, at a receiver, a transmitter channel reservation signal from a transmitter in communication with the receiver;
estimating, at the receiver, a total signal-to-interference metric experienced at the receiver based on one or more of: expected transmissions from one or more neighbor transmitters transmitting one or more neighbor transmitter channel reservation signals received at the receiver, and actual transmissions detected from one or more additional neighbor transmitters at the receiver; and
determining, by the receiver, to refrain from transmitting a receiver channel reservation signal to the transmitter in response to the total signal-to-interference metric remaining within a threshold signal-to-interference level.

11. The method of claim 10, further including:
transmitting, by the receiver, the receiver channel reservation signal to the transmitter in response to the total signal-to-interference metric exceeding the threshold signal-to-interference level.

12. The method of claim 10, wherein the estimating includes:
estimating the total signal-to-interference metric:
using a first calculation for any one or more first transmitters of the one or more neighbor transmitters and one or more additional neighbor transmitters operated by a same network operator associated with the receiver; and
using another calculation for any one or more other transmitters of the one or more neighbor transmitters and one or more additional neighbor transmitters operated by a different network operator.

13. An apparatus configured for wireless communication, the apparatus comprising:
at least one processor; and
a memory coupled to the at least one processor, wherein the at least one processor is configured:
to monitor, by a transmitter, a transmission beam direction associated with one or more receivers identified for communication with the transmitter;
to detect, by the transmitter, a receiver channel reservation signal from one or more neighbor receivers communicating with one or more different transmitters, wherein the receiver channel reservation signal detected from a neighbor receiver of the one or more neighbor receivers includes channel condition information identifying channel conditions observed at the neighbor receiver;
to estimate, by the transmitter, an interference impact metric using the channel condition information, wherein the interference impact metric estimates an impact on the channel conditions observed at the one or more neighbor receivers caused by transmission by the transmitter; and
to determine, by the transmitter, to back off transmission with the one or more receivers in the transmission beam direction in response to the interference impact metric remaining within a threshold interference.

14. The apparatus of claim 13, wherein the transmission beam direction includes one of:
a beam configured to be wider than a transmission beam such that a beam width of the transmission beam direction includes a potential plurality of narrow transmission beams over a maximum of 360 degrees; or
a plurality of narrow beams in different directions along a same general direction as the transmission beam for the one or more receivers.

15. The apparatus of claim 13, wherein the configuration of the at least one processor to estimate includes configuration to estimate the interference impact metric:
using a first calculation for any one or more first receivers of the one or more neighbor receivers operated by a same network operator associated with the transmitter; and
using another calculation for any one or more other receivers of the one or more neighbor receivers operated by a different network operator.

16. The apparatus of claim 13, further including configuration of the at least one processor:
to determine a measure of signal-to-interference at the one or more neighbor receivers;
to determine the interference impact metric exceeds the threshold interference when the measure of signal-to-interference is greater than a maximum level.

17. The apparatus of claim 13, further including configuration of the at least one processor to determine an effective improvement to the measure of signal-to-interference based on the transmitter backing off transmission to the one or more receivers,
wherein
the interference impact metric remains within the threshold interference when the effective improvement exceeds a predetermined amount; and
the interference impact metric exceeds the threshold interference when the effective improvement fails to exceed the predetermined amount.

18. The apparatus of claim 17, wherein at least two receiver channel reservation signals are received from at least two of the one or more neighbor receivers,
wherein the configuration of the at least one processor to determine the measure includes configuration of the at least one processor to determine the measure of signal-to-interference at the at least two of the one or more neighbor receivers, wherein the configuration of the at least one processor to determine the effective improvement includes configuration of the at least one processor:
  to determine a signal-to-interference gain at each of the at least two of the one or more neighbor receivers; and
  to determine an interference relationship of the signal-to-interference gain of the at least two of the one or more neighbor receivers,
  wherein the interference impact metric corresponds to the interference relationship, and
  wherein the predetermined amount is predetermined according to a number of the at least two or the one or more neighbor receivers from which the at least two receiver channel reservation signals is received.

19. The apparatus of claim 13, further including configuration of the at least one processor:
  to identify, by the transmitter, a node identifier (ID) within the channel condition information, wherein the node ID includes one or more of: an ID of one or more interfering transmitters causing substantial interference at the neighbor receiver from which the receiver channel reservation signal is detected, or an ID of one or more user equipments (UEs) associated with a direction of transmission causing the substantial interference from the one or more interfering transmitters;
  to execute the configuration of the at least one processor to estimate and to determine when the node ID is associated with the transmitter.

20. The apparatus of claim 13, wherein the threshold interference corresponds to an interference headroom included within the channel condition information.

21. The apparatus of claim 13, wherein the channel condition information includes one or more of:
  signal-to-interference plus noise ratio (SINR) at the neighbor receiver;
  carrier-to-noise ratio at the neighbor receiver;
  interference-to-noise ratio at the neighbor receiver;
  transmit power of the neighbor receiver for transmission of the receiver channel reservation signal;
  an interference headroom at the neighbor receiver;
  identifier (ID) of one or more interfering transmitters causing substantial interference at the neighbor receiver;
  an ID of one or more user equipments (UEs) associated with a direction of transmission causing the substantial interference from the one or more interfering transmitters;
  a transmission length of the neighbor receiver;
  SINR threshold for the neighbor receiver; and
  a public land mobile network (PLMN) of the neighbor receiver.

22. An apparatus configured for wireless communication, the apparatus comprising:
  at least one processor; and
  a memory coupled to the at least one processor,
  wherein the at least one processor is configured:
    to receive, at a receiver, a transmitter channel reservation signal from a transmitter in communication with the receiver;
    to estimate, at the receiver, a total signal-to-interference metric experienced at the receiver based on one or more of: expected transmissions from one or more neighbor transmitters transmitting one or more neighbor transmitter channel reservation signals received at the receiver, and actual transmissions detected from one or more additional neighbor transmitters at the receiver; and
    to determine, by the receiver, to refrain from transmitting a receiver channel reservation signal to the transmitter in response to the total signal-to-interference metric remaining within a threshold signal-to-interference level.

23. The apparatus of claim 22, further including configuration of the at least one processor to transmit, by the receiver, the receiver channel reservation signal to the transmitter in response to the total signal-to-interference metric exceeding the threshold signal-to-interference level.

24. The apparatus of claim 22, wherein the configuration of the at least one processor to estimate includes configuration to estimate the total signal-to-interference metric:
  using a first calculation for any one or more first transmitters of the one or more neighbor transmitters and one or more additional neighbor transmitters operated by a same network operator associated with the receiver; and
  using another calculation for any one or more other transmitters of the one or more neighbor transmitters and one or more additional neighbor transmitters operated by a different network operator.

* * * * *